(12) United States Patent
Shi et al.

(10) Patent No.: US 8,923,102 B1
(45) Date of Patent: Dec. 30, 2014

(54) OPTICAL GRATING COUPLING FOR INTERFEROMETRIC WAVEGUIDES IN HEAT ASSISTED MAGNETIC RECORDING HEADS

(71) Applicant: Western Digital (Fremont), LLC, Fremont, CA (US)

(72) Inventors: Zhong Shi, Dublin, CA (US); Michael L. Mallary, Sterling, MA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/037,331

(22) Filed: Sep. 25, 2013

Related U.S. Application Data

(60) Provisional application No. 61/846,704, filed on Jul. 16, 2013.

(51) Int. Cl.
*G11B 11/00* (2006.01)

(52) U.S. Cl.
USPC ..................................... 369/13.33; 369/13.32

(58) Field of Classification Search
None
See application file for complete search history.

(56) References Cited

U.S. PATENT DOCUMENTS

| | | | |
|---|---|---|---|
| 4,743,083 A | 5/1988 | Schimpe | |
| 5,173,909 A | 12/1992 | Sakano et al. | |
| 5,199,090 A | 3/1993 | Bell | |
| 5,341,391 A | 8/1994 | Ishimura | |
| 5,495,548 A | 2/1996 | Bilodeau et al. | |
| 5,625,729 A | 4/1997 | Brown | |
| 5,832,155 A | 11/1998 | Rasch et al. | |
| 5,960,014 A | 9/1999 | Li et al. | |
| 6,016,290 A | 1/2000 | Chen et al. | |
| 6,018,441 A | 1/2000 | Wu et al. | |
| 6,025,978 A | 2/2000 | Hoshi et al. | |
| 6,025,988 A | 2/2000 | Yan | |
| 6,032,353 A | 3/2000 | Hiner et al. | |
| 6,033,532 A | 3/2000 | Minami | |
| 6,034,851 A | 3/2000 | Zarouri et al. | |
| 6,043,959 A | 3/2000 | Crue et al. | |
| 6,046,885 A | 4/2000 | Aimonetti et al. | |
| 6,049,650 A | 4/2000 | Jerman et al. | |
| 6,055,138 A | 4/2000 | Shi | |
| 6,058,094 A | 5/2000 | Davis et al. | |
| 6,073,338 A | 6/2000 | Liu et al. | |

(Continued)

FOREIGN PATENT DOCUMENTS

| | | | |
|---|---|---|---|
| EP | 1498878 A2 | 4/2004 | |
| EP | 1501076 A1 | 6/2004 | |

OTHER PUBLICATIONS

Zhong Shi, et. al., U.S. Appl. No. 13/919,949, filed Jun. 17, 2013, 21 pages.

(Continued)

*Primary Examiner* — Paul Huber

(57) ABSTRACT

A heat-assisted magnetic recording (HAMR) transducer is coupled with a laser for providing energy and has an airbearing surface (ABS) configured to reside in proximity to a media during use. The HAMR transducer includes a write pole, at least one coil, a waveguide optically coupled with the laser and a grating. The write pole is configured to write to a region of the media. The coil(s) energize the write pole. The waveguide includes arms that have an optical path difference. The grating is optically coupled with the laser. The waveguide is optically coupled with the grating and receives light from the grating.

23 Claims, 6 Drawing Sheets

(56) References Cited

U.S. PATENT DOCUMENTS

| | | |
|---|---|---|
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,063 B1 | 2/2001 | Cameron |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,221,566 B1 | 4/2001 | Kohnke et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,275,453 B1 | 8/2001 | Ueyanagi et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,396,776 B1 | 5/2002 | Ueyanagi |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,604,223 B1 | 8/2003 | Belser et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |

(56) References Cited

U.S. PATENT DOCUMENTS

| | | |
|---|---|---|
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,671,127 B2 | 12/2003 | Hsu et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,195 B2 | 2/2004 | Miyanishi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Chen et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,795,630 B2 | 9/2004 | Challener et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Spallas et al. |
| 6,834,010 B1 | 12/2004 | Qi et al. |
| 6,834,027 B1 | 12/2004 | Sakaguchi et al. |
| 6,842,544 B2 | 1/2005 | Eldada |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,930,975 B2 | 8/2005 | Tawa et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,967,810 B2 | 11/2005 | Kasiraj et al. |
| 6,969,989 B1 | 11/2005 | Mei |
| 6,975,486 B2 | 12/2005 | Chen et al. |
| 6,975,580 B2 | 12/2005 | Rettner et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,027,700 B2 | 4/2006 | Challener |
| 7,035,046 B1 | 4/2006 | Young et al. |
| 7,041,985 B1 | 5/2006 | Wang et al. |
| 7,042,810 B2 | 5/2006 | Akiyama et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,071,492 B2 | 7/2006 | Li et al. |
| 7,082,007 B2 | 7/2006 | Liu et al. |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,241 B2 | 11/2006 | Che et al. |
| 7,133,253 B1 | 11/2006 | Seagle et al. |
| 7,134,185 B1 | 11/2006 | Knapp et al. |
| 7,151,738 B2 | 12/2006 | Peng |
| 7,154,715 B2 | 12/2006 | Yamanaka et al. |
| 7,170,368 B2 | 1/2007 | Eng |
| 7,170,725 B1 | 1/2007 | Zhou et al. |
| 7,171,080 B2 | 1/2007 | Rausch |
| 7,177,117 B1 | 2/2007 | Jiang et al. |
| 7,190,539 B1 | 3/2007 | Nibarger |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,266,268 B2 | 9/2007 | Challener et al. |
| 7,272,079 B2 | 9/2007 | Challener |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |

(56) References Cited

U.S. PATENT DOCUMENTS

| | | |
|---|---|---|
| 7,310,204 B1 | 12/2007 | Stoev et al. |
| 7,318,947 B1 | 1/2008 | Park et al. |
| 7,319,047 B2 | 1/2008 | Li et al. |
| 7,330,404 B2 | 2/2008 | Peng et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,656 B2 | 5/2008 | Satoh et al. |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,394,607 B2 | 7/2008 | Ohno et al. |
| 7,408,731 B2 | 8/2008 | Uemura et al. |
| 7,412,143 B2 | 8/2008 | Rottmayer et al. |
| 7,417,813 B2 | 8/2008 | Lim et al. |
| 7,417,821 B2 | 8/2008 | Tsuchinaga |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,440,221 B2 | 10/2008 | Tsuchinaga et al. |
| 7,440,660 B1 | 10/2008 | Jin et al. |
| 7,443,625 B2 | 10/2008 | Hamaguchi et al. |
| 7,443,632 B1 | 10/2008 | Stoev et al. |
| 7,444,740 B1 | 11/2008 | Chung et al. |
| 7,486,460 B2 | 2/2009 | Tsuchinaga et al. |
| 7,486,709 B2 | 2/2009 | Hu et al. |
| 7,490,212 B2 | 2/2009 | Kasiraj et al. |
| 7,492,804 B2 | 2/2009 | Tawa |
| 7,493,688 B1 | 2/2009 | Wang et al. |
| 7,500,255 B2 | 3/2009 | Seigler et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,567,387 B2 | 7/2009 | Itagi et al. |
| 7,570,320 B1 | 8/2009 | Anderson et al. |
| 7,580,602 B2 | 8/2009 | Itagi et al. |
| 7,583,466 B2 | 9/2009 | Kermiche et al. |
| 7,595,967 B1 | 9/2009 | Moon et al. |
| 7,596,072 B2 | 9/2009 | Buechel et al. |
| 7,596,295 B2 | 9/2009 | Hasegawa |
| 7,639,457 B1 | 12/2009 | Chen et al. |
| 7,649,677 B2 | 1/2010 | Jin et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,791,839 B2 | 9/2010 | Olson et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,839,497 B1 | 11/2010 | Rausch et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,880,996 B2 | 2/2011 | Stipe |
| 7,898,759 B2 | 3/2011 | Matsumoto et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,672 B2 | 9/2011 | Maeda et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,031,561 B2 | 10/2011 | Hellwig et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,169,881 B2 | 5/2012 | Balamane et al. |
| 8,171,618 B1 | 5/2012 | Wang et al. |
| 8,179,636 B1 | 5/2012 | Bai et al. |
| 8,184,507 B1 | 5/2012 | Hirano et al. |
| 8,184,931 B2 | 5/2012 | Kanagawa et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,228,779 B2 | 7/2012 | Peng et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |

(56) References Cited

U.S. PATENT DOCUMENTS

| | | |
|---|---|---|
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,264,919 B2 | 9/2012 | Komura et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,339,905 B2 | 12/2012 | Rausch et al. |
| 8,339,906 B2 | 12/2012 | Seigler |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,416,646 B2 | 4/2013 | Huang et al. |
| 8,419,953 B1 | 4/2013 | Su et al. |
| 8,419,954 B1 | 4/2013 | Chen et al. |
| 8,422,171 B1 | 4/2013 | Guerini |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,555 B2 | 5/2013 | Seigler et al. |
| 8,451,556 B1 | 5/2013 | Wang et al. |
| 8,451,563 B1 | 5/2013 | Zhang et al. |
| 8,451,707 B1 | 5/2013 | Stipe |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,619,535 B2 | 12/2013 | Balamane et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,630,517 B1 | 1/2014 | Okayama |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |

(56) References Cited

U.S. PATENT DOCUMENTS

| | | |
|---|---|---|
| 2001/0006435 A1 | 7/2001 | Ichihara et al. |
| 2001/0017820 A1 | 8/2001 | Akiyama et al. |
| 2003/0184903 A1 | 10/2003 | Challener |
| 2003/0198146 A1 | 10/2003 | Rottmayer et al. |
| 2004/0001394 A1 | 1/2004 | Challener et al. |
| 2004/0001420 A1 | 1/2004 | Challener |
| 2004/0008943 A1 | 1/2004 | Berini |
| 2004/0027728 A1 | 2/2004 | Coffey et al. |
| 2004/0223249 A1 | 11/2004 | Kang et al. |
| 2004/0228022 A1 | 11/2004 | Ueyanagi |
| 2005/0047013 A1 | 3/2005 | Le et al. |
| 2005/0078565 A1 | 4/2005 | Peng et al. |
| 2005/0122850 A1 | 6/2005 | Challener et al. |
| 2005/0157393 A1 | 7/2005 | Hasegawa et al. |
| 2005/0157595 A1 | 7/2005 | Tawa et al. |
| 2005/0157597 A1 | 7/2005 | Sendur et al. |
| 2005/0289576 A1 | 12/2005 | Challener |
| 2006/0012907 A1 | 1/2006 | Ozue |
| 2006/0105203 A1 | 5/2006 | Li et al. |
| 2006/0114781 A1 | 6/2006 | Lee |
| 2006/0232874 A1 | 10/2006 | Tsuchinaga et al. |
| 2007/0030588 A1 | 2/2007 | Tsuchinaga et al. |
| 2007/0081426 A1 | 4/2007 | Lee et al. |
| 2007/0081427 A1 | 4/2007 | Suh et al. |
| 2007/0223132 A1 | 9/2007 | Tsuchinaga |
| 2007/0279791 A1 | 12/2007 | Mallary |
| 2008/0002529 A1 | 1/2008 | Sekine et al. |
| 2008/0013912 A1 | 1/2008 | Shukh et al. |
| 2008/0049563 A1 | 2/2008 | Konno et al. |
| 2008/0055343 A1 | 3/2008 | Cho et al. |
| 2008/0180827 A1 | 7/2008 | Zhu et al. |
| 2008/0181560 A1 | 7/2008 | Suh et al. |
| 2008/0198496 A1 | 8/2008 | Shimazawa et al. |
| 2008/0204916 A1 | 8/2008 | Matsumoto et al. |
| 2008/0212228 A1 | 9/2008 | Shibano |
| 2008/0232225 A1 | 9/2008 | Cho et al. |
| 2009/0237671 A1 | 9/2009 | Verschuren |
| 2010/0020431 A1 | 1/2010 | Shimazawa et al. |
| 2010/0074062 A1 | 3/2010 | Kamijima et al. |
| 2010/0074063 A1* | 3/2010 | Peng et al. ............... 369/13.32 |
| 2010/0290157 A1 | 11/2010 | Zhang et al. |
| 2011/0086240 A1 | 4/2011 | Xiang et al. |
| 2011/0205866 A1 | 8/2011 | Osawa et al. |
| 2011/0217003 A1* | 9/2011 | Gage et al. ............... 385/30 |
| 2011/0228651 A1 | 9/2011 | Gage et al. |
| 2011/0228652 A1 | 9/2011 | Gage et al. |
| 2011/0235480 A1 | 9/2011 | Goulakov et al. |
| 2012/0020195 A1 | 1/2012 | Seigler |
| 2012/0039155 A1 | 2/2012 | Peng et al. |
| 2012/0082016 A1 | 4/2012 | Komura et al. |
| 2012/0087613 A1 | 4/2012 | Rasras |
| 2012/0111826 A1 | 5/2012 | Chen et al. |
| 2012/0113770 A1 | 5/2012 | Stipe |
| 2012/0201491 A1* | 8/2012 | Zhou ............... 385/14 |
| 2012/0216378 A1 | 8/2012 | Emley et al. |
| 2012/0237878 A1 | 9/2012 | Zeng et al. |
| 2012/0298621 A1 | 11/2012 | Gao |
| 2012/0327752 A1* | 12/2012 | Snyder ............... 369/13.13 |
| 2012/0327754 A1* | 12/2012 | Olson ............... 369/47.15 |
| 2013/0133182 A1 | 5/2013 | Bonhote et al. |
| 2013/0216702 A1 | 8/2013 | Kaiser et al. |
| 2013/0216863 A1 | 8/2013 | Li et al. |
| 2013/0257421 A1 | 10/2013 | Shang et al. |

OTHER PUBLICATIONS

Zhong Shi, et. al., U.S. Appl. No. 13/797,268, filed Mar. 12, 2013, 21 pages.

Yufeng Hu, et. al., U.S. Appl. No. 13/756,379, filed Jan. 31, 2013, 34 pages.

Michael V. Morelli, et. al., U.S. Appl. No. 14/034,487, filed Sep. 23, 2013, 24 pages.

Alexander Krichevsky, et. al., U.S. Appl. No. 13/927,996, filed Jun. 26, 2013, 30 pages.

Zhong Shi, et. al., U.S. Appl. No. 13/621,728, filed Sep. 17, 2012, 17 pages.

Chubing Peng, "Surface-plasmon resonance of a planar lollipop near-field transducer", Applied Physics Letters 94, 171106 (2009), 3 pages.

Chen-Fu Chu, et al., "Study of GaN light-emitting diodes fabricated by laser lift-off technique", Journal of Appl. Phys., vol. 95, No. 8, Apr. 15, 2004, pp. 3916-3922.

Chao-Yi Tai, et al., "UV Photosensitivity in a Ta2O5 Rib Waveguide Mach-Zehnder Interferometer", IEEE Photonics Technology Letters, Vol. 16, No. 6, Jun. 2004, pp. 1522-1524.

Challener, et al., "Miniature planar solid immersion mirror with focused spot less than a quarter wavelength", Optics Express, vol. 13. No. 18, Sep. 5, 2005, 9 pages.

Wang, et al., "Thermo-optic properties of sol-gel-fabricated organic—inorganic hybrid waveguides", J. Appl. Phys., Vol. 94, No. 6, Sep. 15, 2003, pp. 4228-4230.

Y.P. Rakovich, et al., "Photonic Nanojets in Coupled Microcavities", European Conference on Lasers and Electro-Optics 2009 and the European Quantum Electronics Conference (CLEO Europe - EQEC 2009), Munich, Jun. 14-19, IEEE, 2009, pp. 5191625.

Almeida, et al., "Nanotaper for compact mode conversion", Optics Letters, vol. 28, No. 15, pp. 1302-1304, Aug. 1, 2003.

McNAB, et al., "Ultra-low loss photonic integrated circuit with membrane-type photonic crystal waveguides", Optics Express , vol. 11, No. 22, pp. 2927-2939, Nov. 3, 2003.

Galan, et al., "Horizontal slot waveguide-based efficient fiber couplers suitable for silicon photonics", Eindhoven, The Netherlands, pp. 237-240, Jun. 2008.

Sun, et al., "Efficient fiber coupler for vertical silicon slot waveguides", Optics Express, vol. 17, No. 25, pp. 22571-22577, Dec. 7, 2009.

Sridaran, et al., "Nanophotonic devices on thin buried oxide Silicon-On-Insulator substrates", 7 pages, Nov. 2009.

Khilo, et al., "Efficient planar fiber-to-chip coupler based on two-stage adiabatic evolution", Optics Express,vol. 18, No. 15, pp. 15790-15806, Jul. 19, 2010.

Humer, et al., "Development of Broadband, Polarization Insensitive Light Couplers for a SOI Based Integrated Optics", Proceedings GMe Forum, pp. 51-52, Apr. 2011.

Luennemann, et al., "Electrooptic properties of lithium niobate crystals for extremely high external electric fields", Appl. Phys. B 76, 403-406 (2003).

Rottmayer, et al., "Heat-Assisted Magnetic Recording", IEEEE Transactions on Magnetics, vol. 42, No. 10, Oct. 2006, 5 pages.

Seigler, et al., "Integrated Heat Assisted Magnetic Recording Head: Design and Recording Demonstration", IEEE Transactions on Magnetics, Vol. 44, No. 1, Jan. 2008, 6 pages.

\* cited by examiner

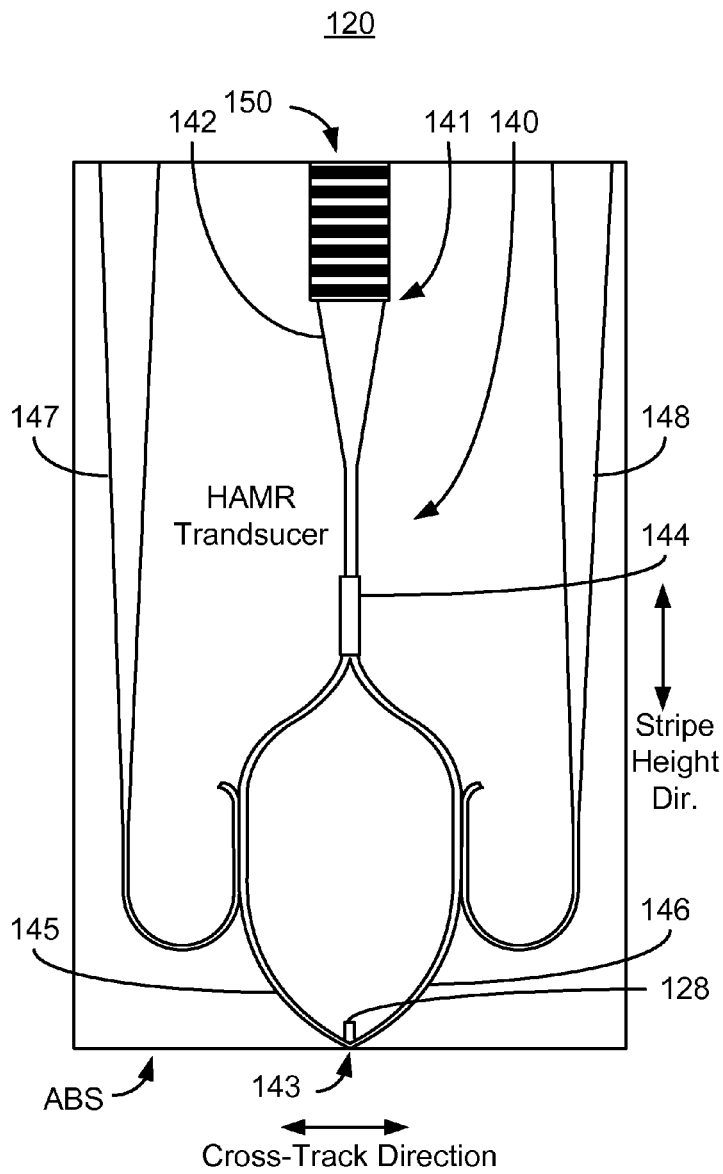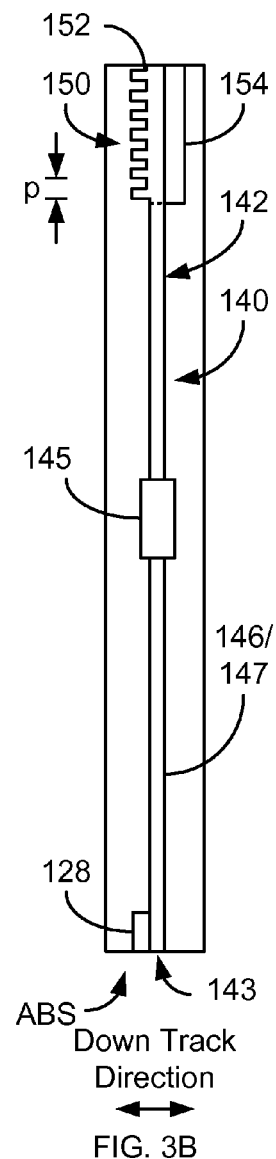
FIG. 3A
FIG. 3B

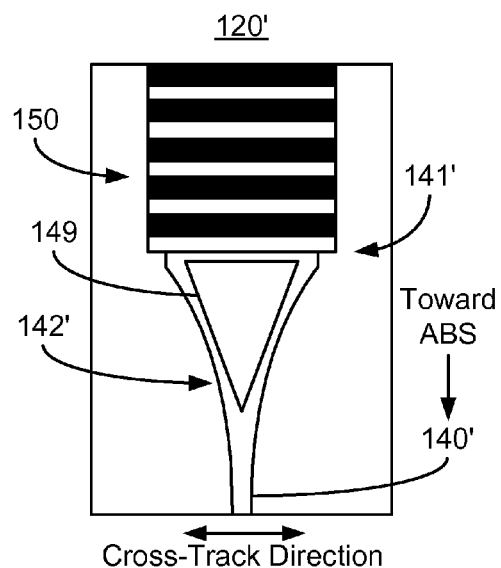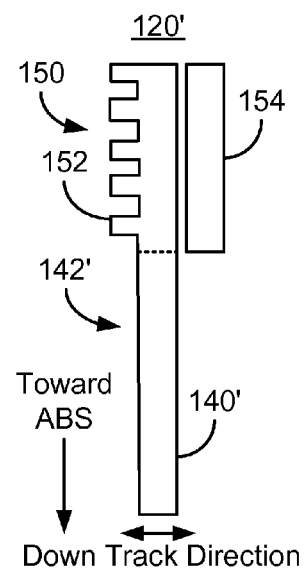
FIG. 4A · FIG. 4B
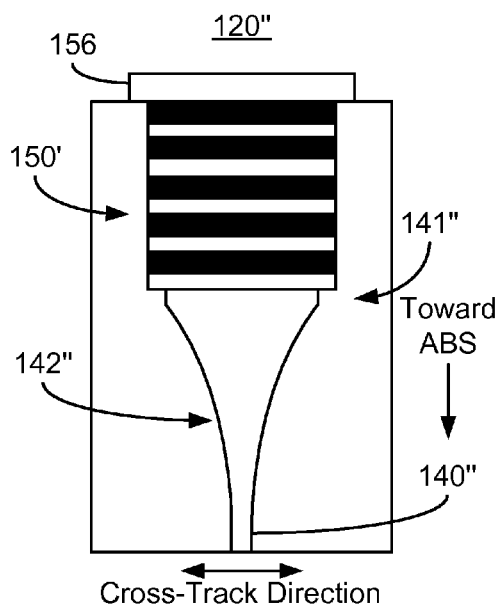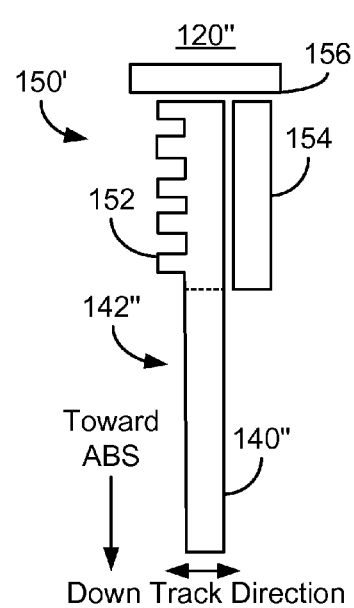
FIG. 5A · FIG. 5B

OPTICAL GRATING COUPLING FOR INTERFEROMETRIC WAVEGUIDES IN HEAT ASSISTED MAGNETIC RECORDING HEADS

CROSS-REFERENCE TO RELATED APPLICATIONS

This application claims priority to provisional U.S. Patent Application Ser. No. 61/846,704, filed on Jul. 16, 2013, which is hereby incorporated by reference in its entirety.

BACKGROUND

FIG. 1 depicts a plan view of a portion of a conventional heat assisted magnetic recording (HAMR) disk drive 10. The conventional HAMR disk drive 10 includes a media 12, a laser 20 and a HAMR transducer 30 formed on a slider 25. The HAMR transducer 30 includes a near-field transducer (NFT) 32, a pole 34, coil(s) 36 and a waveguide 40. The waveguide 40 directs light from its entrance 42 to the exit 44 near the ABS.

The waveguide 40 is butt-coupled to the laser 20. Stated differently, the waveguide 40 is positioned with its entrance 42 essentially at the exit at which light leaves the laser 20. The waveguide 40 directs light from the laser 20 to the waveguide exit 44 at the ABS. The NFT 32 is optically coupled with the waveguide 40. Thus, light is coupled into the NFT 32.

In operation, the light is provided from the laser 20 to the waveguide 40 via the entrance 42. The light travels toward the exit 44 and is coupled into the NFT 32. The NFT 32 utilizes resonances in surface plasmons to couple light into the media 12 at a spot size smaller than the optical diffraction limit. The coils 36 energize the pole 34 to magnetically write to a portion of the media 12 heated by the spot size at a relatively modest field. Thus, data may be written to the media 12.

Although the conventional HAMR transducer 30 functions, there are drawbacks. The laser 20 bonding of the laser 20 to the back of the slider 25 is may be difficult to do. For example, the laser 20 may be bonded to a different substrate, which is then individually bonded to the slider 25. This bonding process may take a significant amount of time and may have alignment issues between the laser 20 and entrance 42 of the waveguide 40 Throughput and yield for the fabrication process may thus be adversely affected.

Accordingly, what is needed is a HAMR transducer that may have improved fabrication.

BRIEF DESCRIPTION OF SEVERAL VIEWS OF THE DRAWINGS

FIGS. 3A and 3B depict plan and side views of an exemplary embodiment of a portion of a heat assisted magnetic recording transducer.

FIGS. 4A and 4B depict plan and side views of another exemplary embodiment of a portion of a heat assisted magnetic recording transducer.

FIGS. 5A and 5B depict plan and side views of another exemplary embodiment of a portion of a heat assisted magnetic recording transducer.

DETAILED DESCRIPTION OF THE PREFERRED EMBODIMENTS

Figure 1:
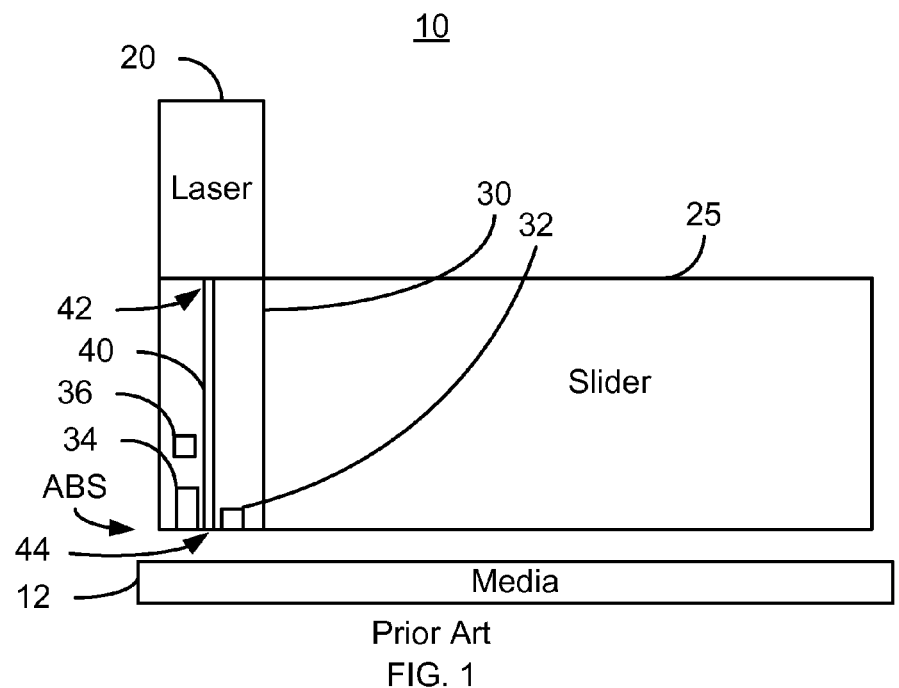
FIG. 1 is a diagram depicting a side view of a conventional HAMR disk drive.
Figure 2:
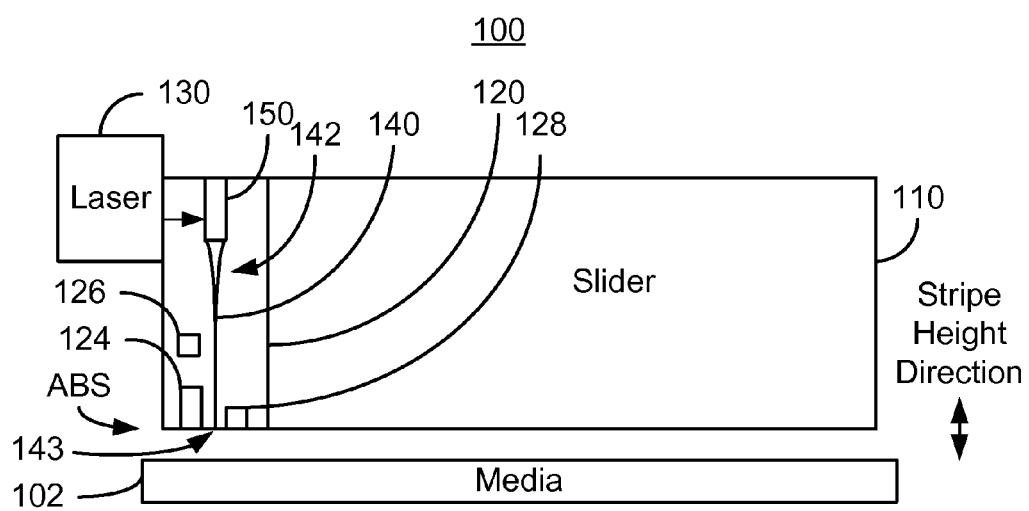
FIG. 2 is depicts an exemplary embodiment of a heat assisted magnetic recording disk drive.

FIG. 2 depicts a side view of an exemplary embodiment of a portion of a heat assisted magnetic recording (HAMR) disk drive 100. For clarity, FIG. 2 is not to scale. For simplicity not all portions of the HAMR disk drive 100 are shown. In addition, although the HAMR disk drive 100 is depicted in the context of particular components other and/or different components may be used. For simplicity, only single components are shown. However, multiples of the component(s) and/or their sub-component(s) might be used.

The HAMR disk drive 100 includes media 102, a slider 110, a HAMR transducer 120 and a laser 130. Additional and/or different components may be included in the HAMR disk drive 100. The slider 110, and thus the laser 130 and HAMR transducer 120 are generally attached to a suspension (not shown). The HAMR transducer 120 is fabricated on the slider 110 and includes an air-bearing surface (ABS) proximate to the media 102 during use. Although not shown, the laser 130 may be attached to a substrate or other submount, for example for mechanical stability. Further, the laser 130 is shown as being attached to the side surface of the slider 110, which may be accomplished using wafer level bonding processes. However, in other embodiments, the laser 130 may be bonded in a different location and/or using different methods.

In general, the HAMR disk drive 100 includes a write transducer and a read transducer. However, for clarity, only the write portion (HAMR transducer 120) of the head is shown. The HAMR transducer 120 includes a waveguide 140, write pole 124, coil(s) 126 and near-field transducer (NFT) 128. In other embodiments, different and/or additional components may be used in the HAMR transducer 120. The waveguide 140 guides light to the NFT 128, which resides near the ABS. The NFT 128 utilizes local resonances in surface plasmons to focus the light to magnetic recording media 102. At resonance, the NFT 128 couples the optical energy of the surface plasmons efficiently into the recording medium layer of the media 102 with a confined optical spot which is much smaller than the optical diffraction limit. This optical spot can rapidly heat the recording medium layer to near or above the Curie point. High density bits can be written on a high coercivity medium with the pole 124 energized by the coils 126 to a modest magnetic field.

The waveguide 140 shown is a tapered waveguide. Thus, the waveguide 140 includes a tapered region 142 as well as a bottom region 143 near the ABS. The tapered waveguide 140 includes at least a first side and a second side opposite to the first side. The first side and the second side converge toward the ABS at least in the tapered region 142. In some embodiments other sides of the tapered waveguide may also converge. In other embodiments, the remaining sides may not converge. In the embodiment shown in FIGS. 2-3B, the sides of the tapered region 142 converge linearly. In other embodiments, the tapered region 142 is a higher ordered tapered region. In such embodiments, the sides in accordance with a function having at least one term having an order greater than one. In some embodiments, the highest order term of the function is two. Thus, the tapered waveguide 140 would then be a quadratic tapered waveguide. In other embodiments, the tapered waveguide 140 may have higher order terms. For example, the tapered waveguide may be a cubic tapered waveguide. A single term or multiple terms of the same or different order may also describe the design of the taper for the tapered waveguide 140. Further, where multiple terms are present in the function describing the taper, some terms may have an order less than or equal to one. In general, a mode converter is not necessary. However, although not depicted in FIG. 2, the tapered waveguide 140 may be coupled to a mode converter. In such embodiments, the mode converter also tapers. Thus, the mode converter also confines the laser mode to smaller dimensions. In some embodiments, the mode converter tapers in the same manner as the tapered section of the tapered waveguide. However, in other embodiments, the mode converter may taper in another fashion. Further, the tapered waveguide 140 may taper in accordance with function(s) having terms with non-integer powers. In some embodiments, however, the taper may be removed from the waveguide 140 or may be an inverse taper in which the sides diverge in a direction toward the ABS.

The waveguide 140 may also be an interferometric waveguide (IWG). FIGS. 3A and 3B depict plan and side views of a portion of the HAMR transducer 120 and, therefore, the disk drive 100. For clarity, FIGS. 3A and 3B are not to scale. For simplicity not all portions of the tapered IWG 140 are shown. In addition, although the tapered waveguide 140 is depicted in the context of particular components other and/or different components may be used. Referring to FIGS. 2, 3A and 3B, the IWG 140 includes an entrance 141, the tapered region 142, a bottom 143 at or near the ABS, a splitter 144, and arms 145 and 146. The sides of the tapered waveguide 140 are shown as tapering in the cross-track direction, but not in the down track direction. The sides of the tapered IWG 140 may converge only in the cross-track direction, only in the down track direction, or in both the cross-track and down track directions. Further, the sides of the tapered IWG 140 are shown as being symmetric in FIGS. 2, 3A and 3B. Thus, opposite sides of the tapered IWG 140 converge in a like manner. However, in other embodiments, opposing sides of the tapered IWG 140 may be asymmetric and converge in different manners. As discussed above the sidewalls waveguide core for the tapered section 146 converge at a higher order than one (linearly). For example, in one embodiment, the sidewalls may converge based on a quadratic, cubic or other order greater than one. A single term or multiple terms of the same or different order may also describe the design of the taper 146 for the tapered IWG 140. Also shown in FIG. 3A are optional taps 147 and 148, which may be used to couple out some of the light propagating through the arms 145 and 146, respectively. The arms 145 and 146 of the waveguide 140 have an optical path difference. As a result, light from the laser 130 is split between the arms at or near the splitter 144, travels through arms 145 and 146 and recombines near the bottom 143. As such a standing wave interference pattern may be formed.

As shown in FIGS. 2, 3A and 3B, the HAMR transducer 120 also includes a coupling grating 150. The coupling grating is used to couple in light from the laser 130 and provide the light to the waveguide 140. The direction of travel of light from the laser 130 to the grating 150 is shown by an arrow in FIG. 2. In the embodiment shown, the coupling grating 150 includes an optical grating 152 and a reflector 154. The grating 152 has a pitch, p, that is configured to couple in light from the laser 120. The pitch depends upon the wavelength of light emitted by the laser 120. In embodiments in which the wavelength of light is in the range of 830 nm, the pitch of the grating 152 may be on the order of five hundred nanometers. The reflector 154 may reflect light that may otherwise be lost, allowing in an additional opportunity to be coupled into the waveguide 140. Although shown as adjoining the grating, the reflector 154 may be spaced apart from the grating 152. For example, the reflector 154 may be a few hundred nanometers away from the grating 152. In some embodiments, the reflector 152 is a mirror. In other embodiments, the reflector may be a Bragg reflector or other reflector.

In operation, the laser 130 emits light that is provided to the coupling grating 150. The coupling grating 150 couples in some portion of the light to the IWG 140. The taper 142 of the tapered IWG 140 and, in some embodiments, a mode converter (not shown in FIGS. 2, 3A and 3B) confine the mode propagated through the IWG 140 to a smaller physical area. In addition, the tapered IWG 140 directs the light toward the NFT 128. The NFT 128 focuses the light to a region of magnetic recording media 102 using surface plasmons. The NFT 128 thus couples the optical energy of the light into the recording medium layer of the media 102 with a confined optical spot that is much smaller than the optical diffraction limit. This optical spot can typically heat the recording medium layer above the Curie point on the sub-nanosecond scale. While the medium 102 is heated, high density bits can be written on a high coercivity medium with the pole 124 energized by the coils 126 to a modest magnetic field.

Use of the HAMR transducer 120 may improve the HAMR disk drive 100. In particular, the taper 142 may more rapidly confine the mode propagated by the IWG 140 and may make the mode propagated through the IWG 140 more stable. The coupling grating 150 may be less sensitive to misalignments of the laser 130 along the direction of the grating 150. Stated differently, in the embodiment shown, the HAMR transducer 120 allows looser tolerances for alignment of the laser 130 in the stripe height direction. Thus, processing is simplified. In addition, use of the coupling grating 150 may allow for different geometries of the HAMR disk drive 100. For example, the laser 130 may be mounted on the back surface of the slider 110. This may also enable the use of laser such as vertical surface emitting laser (VCSEL). Wafer bonding processed may thus be used to align and affix the laser 130 to the slider 110 before the wafer containing the slider 110 is cut into individual sliders. Thus, in some embodiments, the laser 130 may be mounted on the side surface of the slider 110 as shown in FIG. 2. Consequently, throughput and yield during fabrication of the HAMR transducer 120 may be improved. Thus, fabrication and performance of the HAMR disk drive 100 may be enhanced.

FIGS. 4A and 4B depict plan and side views of a portion of a HAMR transducer 120'. For clarity, FIGS. 4A and 4B are not to scale. For simplicity not all portions of the transducer 120' are shown. The HAMR transducer 120' is analogous to the HAMR transducer 120. Thus, the HAMR transducer 120' may reside in the disk drive 100. Analogous portions of the HAMR transducer 120' are labeled similarly in FIGS. 4A and 4B. Referring to FIGS. 2 and 4A-4B, the HAMR transducer 120' includes a tapered waveguide 140' that has an entrance 141', a taper 142' and arms (not shown in FIGS. 4A and 4B) that are analogous to the tapered waveguide 140, entrance 141, taper 142 and arms 145 and 146, respectively. The HAMR transducer 140' also includes a coupling grating 150 including a grating 152 and reflector 154 analogous to the coupling grating 150 including grating 152 and reflector 154, respectively that are depicted in FIGS. 3A-3B. The tapered waveguide 140' may be a tapered IWG 140' analogous to the IWG 140 depicted in FIGS. 3A-3B.

In the embodiment shown, the tapered IWG 140' has a quadratic tapered region 142'. Thus, the sides at least the cross track direction converge toward the ABS in accordance with a function having a highest power of two. In other embodiments, other functions are possible including an inverse taper may be used. In addition, an optional mode converter 149 is shown. The mode converter 149 is also tapered. However, the mode converter 149 is linearly tapered. Thus, the manner in which the mode converter 149 and the tapered section 142' converge need not be the same. In other embodiments, the mode converter 149 and the tapered section 142 may converge in accordance with substantially the same function. However, the mode converter 149 may also be omitted. The IWG 140' is not tapered in the down track direction shown in FIG. 4B. However, in other embodiments, the IWG 140' may be tapered in the down track direction.

The HAMR transducer 120' operates in an analogous manner to the HAMR transducer 120. The laser 130 emits light that is provided to the coupling grating 150. The coupling grating 150 couples in some portion of the light to the IWG 140'. The taper 142' and mode converter 149 confine the mode propagated through the IWG 140' to a smaller physical area. The tapered IWG 140' directs the light toward the NFT 128, which focuses the light on to the media 102. This heats the media 102 in a small region. While the region of the media 102 is heated, high density bits can be written on a high coercivity medium with the pole 124 energized by the coils 126 to a modest magnetic field.

Use of the HAMR transducer 120' may improve the HAMR disk drive 100. In particular, the taper 142' and mode converter 149 may more rapidly confine the mode propagated by the IWG 140' and may make the mode propagated through the IWG 140 more stable. The coupling grating 150 may be less sensitive to misalignments of the laser 130 along the direction of the grating 150. Thus, processing is simplified. In addition, use of the coupling grating 150 may allow for different geometries of the HAMR disk drive 100. Consequently, throughput and yield during fabrication of the HAMR transducer 120' as well as performance of the HAMR disk drive 100 may be improved.

FIGS. 5A and 5B depict plan and side views of a portion of a HAMR transducer 120". For clarity, FIGS. 5A and 5B are not to scale. For simplicity not all portions of the transducer 120" are shown. The HAMR transducer 120" is analogous to the HAMR transducers 120 and/or 120'. Thus, the HAMR transducer 120" may reside in the disk drive 100. Analogous portions of the HAMR transducer 120" are labeled similarly in FIGS. 5A and 5B. Referring to FIGS. 2 and 5A-5B, the HAMR transducer 120" includes a tapered waveguide 140" that has an entrance 141", a taper 142" and arms (not shown in FIGS. 5A and 5B) that are analogous to the tapered waveguide 140/140', entrance 141/141', taper 142/142' and arms 145 and 146, respectively. The HAMR transducer 120" also includes a coupling grating 150' analogous to the coupling grating 150' depicted in FIGS. 3A-4B. The tapered waveguide 140" may be a tapered IWG 140" analogous to the IWG 140 depicted in FIGS. 3A-3B.

In the embodiment shown, the tapered IWG 140" is tapered with a quadratic taper. Thus, the sides at least the cross track direction converge toward the ABS in accordance with a function having a highest power of two. In other embodiments, other functions are possible including an inverse taper may be used. In other embodiments, a mode converter (not shown) may be included. Note that the IWG 140" is not tapered in the down track direction shown in FIG. 5B. However, in other embodiments, the IWG 140" may be tapered in the down track direction.

The coupling grating 150' includes the grating 152 and reflector 154 analogous to the grating 152 and reflector 154 depicted in FIGS. 3A, 3B, 4A and 4B. In addition, the coupling grating 150' includes a back reflector 156. The back reflector 156 may be a Bragg reflector, a mirror or other reflector. The reflector 156 may be used to improve the efficiency of the grating 150' when the light from the laser 130 is incident on the grating 152 in the down track direction (substantially perpendicular to the direction toward the ABS). In such an embodiment, approximately fifty percent of the light form the laser 130 would be coupled into the grating 152 in the direction toward the ABS. However, the other fifty percent would be coupled into the grating 152 in the opposite direction, away from the ABS. The presence of the reflector 156 recycles this light back to the grating 152. Thus, the efficiency of the coupling grating 150' may be improved.

Figure 6:
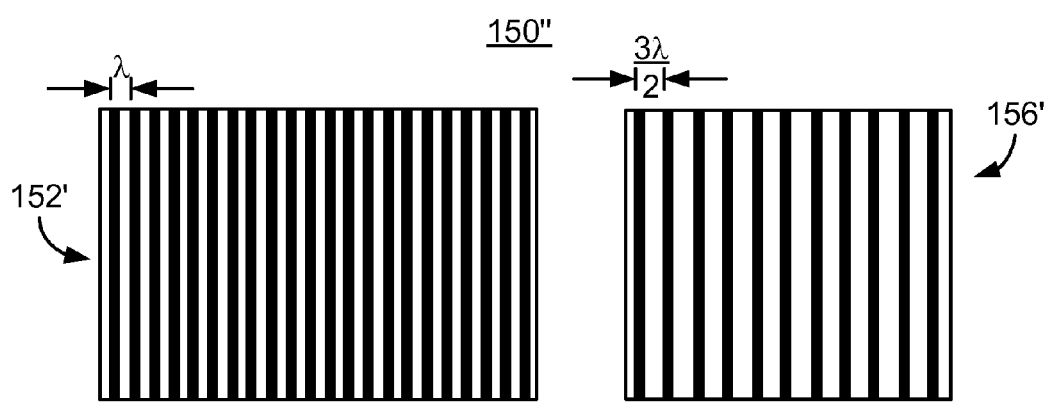
FIG. 6 depicts an exemplary embodiment of a portion of a coupling grating that can be used in a HAMR transducer.

For example, FIG. 6 depicts an exemplary embodiment of a portion of a coupling grating 150" that may be used in the coupling grating 150 and/or 150'. In particular, a grating 152' and a reflector 156' are shown. The grating 152' has a pitch that is an integer multiple of λ. In the embodiment shown, the integer selected is one. Thus, the grating 152' may be used to couple in light from a VCSEL. In contrast, the reflector 156' is a Bragg reflector. Thus, the pitch is desired to be (n+½)λ, where n is an integer. In the embodiment shown, n is one. Thus, the gratings 152' and 156' may operate together to improve the coupling of the laser 130, such as a VCSEL, in which light is incident on the coupling grating 150'/150" perpendicular to the stripe height direction.

The HAMR transducer 120" operates in an analogous manner to the HAMR transducers 120 and/or 120'. The laser 130 emits light that is provided to the coupling grating 150'. The coupling grating 150' couples in some portion of the light to the IWG 140". The taper 142" confines the mode propagated through the IWG 140". The tapered IWG 140" directs the light toward the NFT 128, which focuses the light on to the media 102. This heats the media 102 in a small region. While the region of the media 102 is heated, high density bits can be written on a high coercivity medium with the pole 124 energized by the coils 126 to a modest magnetic field.

Use of the HAMR transducer 120" may improve the HAMR disk drive 100. In particular, the taper 142" may more rapidly confines the mode propagated by the IWG 140" and may make the mode propagated through the IWG 140" more stable. The coupling grating 150' may be less sensitive to misalignments of the laser 130 along the direction of the grating 150. Thus, processing is simplified. Use of the coupling grating 150'/150" may allow for different geometries of the HAMR disk drive 100 that may facilitate fabrication. The presence of the reflector 156/156' in the coupling grating 150' may improve the optical efficiency of the coupling grating 150' and, therefore the HAMR transducer 120'. Consequently, throughput and yield during fabrication of the HAMR transducer 120" as well as performance of the HAMR disk drive 100 may be improved.

Figure 7:
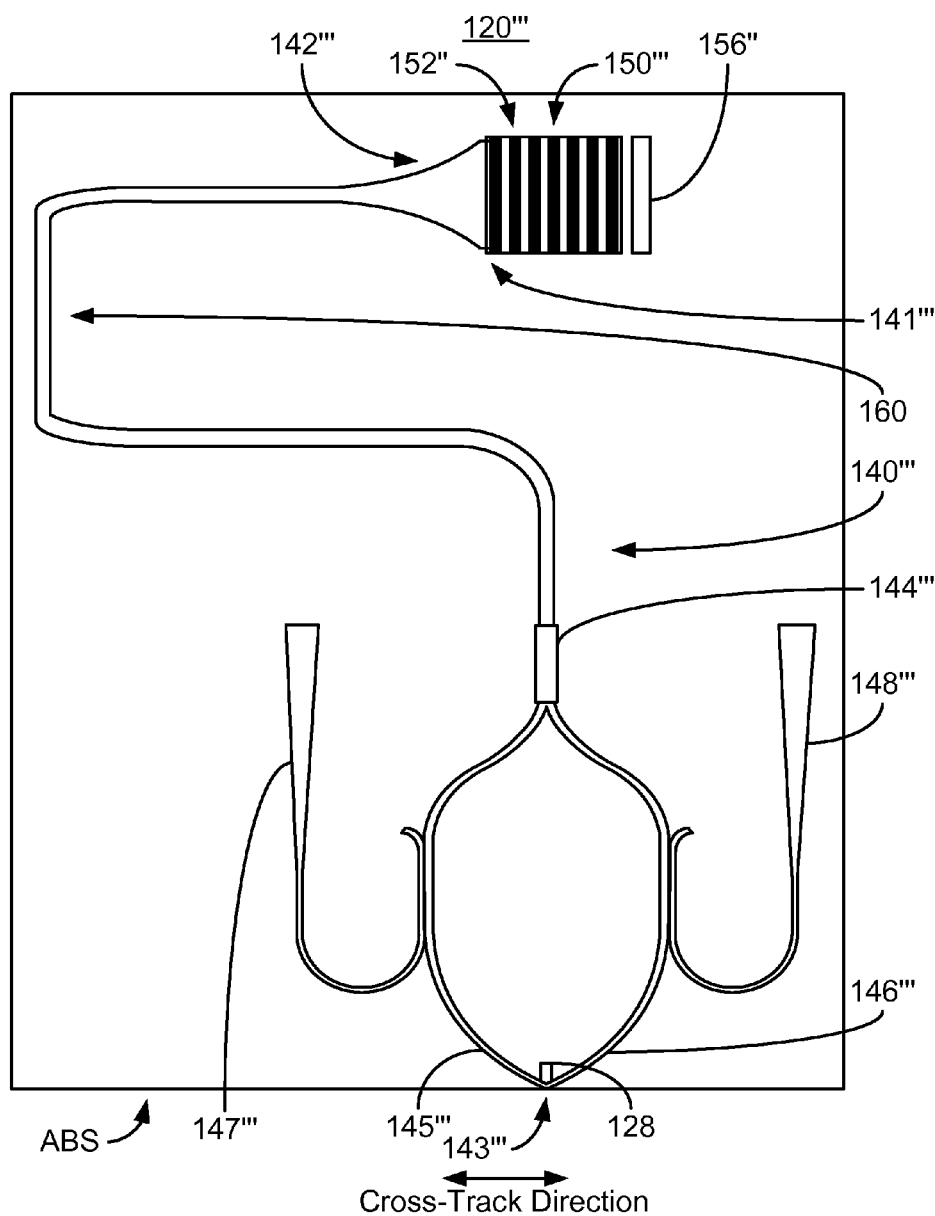
FIG. 7 depicts a plan view of another exemplary embodiment of a portion of a HAMR transducer.

FIG. 7 depicts a plan view of a portion of a HAMR transducer 120'''. For clarity, FIG. 7 is not to scale. For simplicity not all portions of the transducer 120''' are shown. The HAMR transducer 120''' is analogous to the HAMR transducers 120, 120' and/or 120". Thus, the HAMR transducer 120''' may reside in the disk drive 100. Analogous portions of the HAMR transducer 120''' are labeled similarly in FIG. 7. Referring to FIGS. 2 and 7, the HAMR transducer 120''' includes a tapered waveguide 140''' that has an entrance 141''', a taper 142''', splitter 144''', arms 145''' and 146''', taps 147''' and 148''' that are analogous to the tapered waveguide 140/140'/140", entrance 141/141'/141", taper 142/142'/142", arms 145 and 146, and taps 147 and 148 respectively. The HAMR transducer 120''' also includes a coupling grating 150''' analogous to the coupling gratings 150/150'/150" depicted in FIGS.

3A-6. The tapered waveguide 140''' is a tapered IWG 140" analogous to the IWG 140 depicted in FIGS. 3A-3B.

In the embodiment shown, the coupling grating 150''' includes the grating 152" and reflector (not shown in FIG. 7) analogous to the grating 152/152' and reflector 154 depicted in FIGS. 3A-6. In addition, the coupling grating 150''' includes a back reflector 156" analogous to the reflector 156/156'. The back reflector 156" may be a Bragg reflector, a mirror or other reflector. In addition, as can be seen in FIG. 7 the grating 152" and reflector 156" are oriented substantially perpendicular to the direction of orientation of the gratings 152/152' and reflector 156/156'. The reflector 156" is thus oriented substantially perpendicular to the ABS, while the reflector 156/156' are substantially parallel to the ABS. Thus, the reflector 156" reflects light with a direction of propagation at least partially in the cross track direction.

The HAMR transducer 120''' operates in an analogous manner to the HAMR transducers 120, 120' and/or 120". The laser 130 emits light that is provided to the coupling grating 150'''. The coupling grating 150''' couples in some portion of the light to the IWG 140'''. The taper 142''' confines the mode propagated through the IWG 140'''. The tapered IWG 140''' directs the light toward the NFT 128, which focuses the light on to the media 102. This heats the media 102 in a small region. While the region of the media 102 is heated, high density bits can be written on a high coercivity medium with the pole 124 energized by the coils 126 to a modest magnetic field.

Use of the HAMR transducer 120''' may improve the HAMR disk drive 100. In particular, the taper 142" may more rapidly confine the mode propagated by the IWG 140''' and may make the mode propagated through the IWG 140''' more stable. The coupling grating 150''' may provide greater tolerances for laser 130 misalignment in the cross-track direction and allow for different geometries of the HAMR disk drive 100 that may facilitate fabrication. The presence of the reflector 156" in the coupling grating 150''' may improve the optical efficiency of the coupling grating 150''' and, therefore the HAMR transducer 120'''. In addition, the orientation of the grating 152" and reflector 156" may allow for more space to fabricate the waveguide 140'''. Thus, fabrication and design of the HAMR transducer may be enhanced. Consequently, throughput and yield during fabrication of the HAMR transducer 120''' as well as performance of the HAMR disk drive 100 may be improved.

Figure 8:
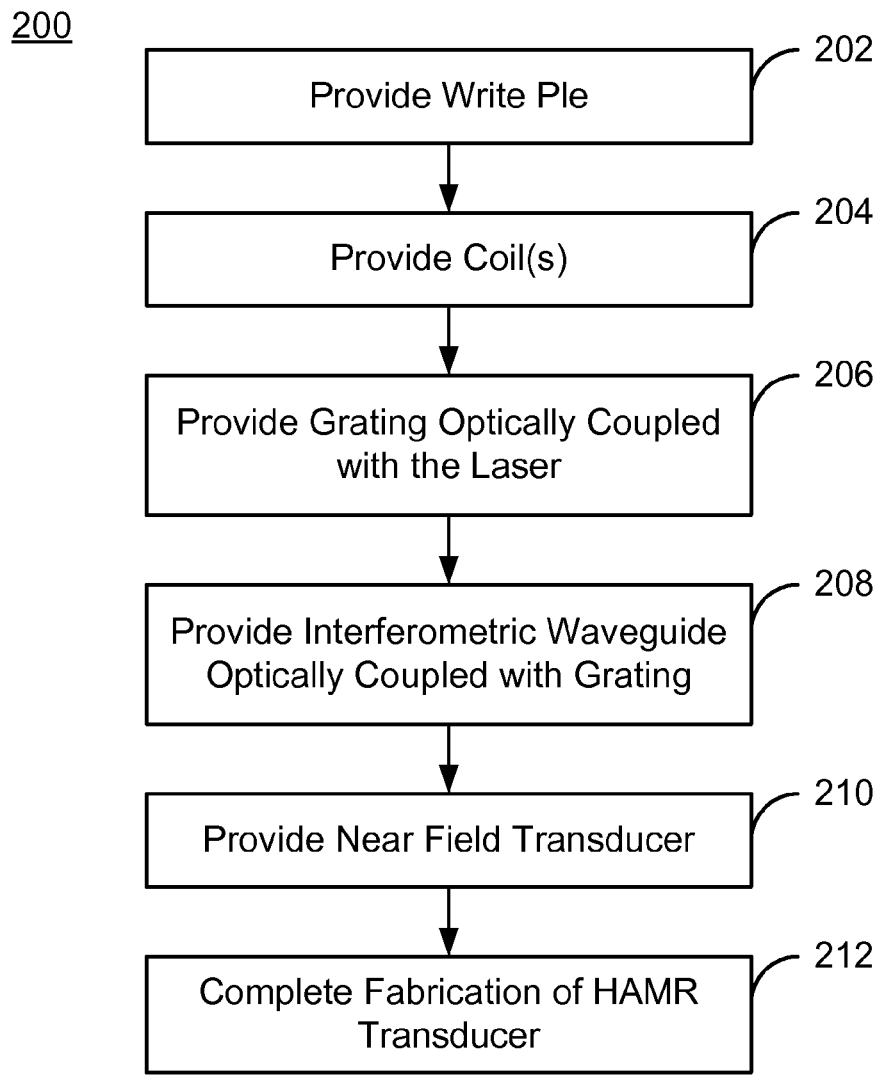
FIG. 8 is a flow chart depicting an exemplary embodiment of a method for fabricating a HAMR transducer.

FIG. 8 is a flow chart depicting an exemplary embodiment of a method 200 for fabricating HAMR transducers having coupling gratings used in conjunction with IWGs. In particular, the method 200 may be used in fabricating a HAMR transducer 120, 120', 120" and/or 120'''. For simplicity, some steps may be omitted, performed in another order, interleaved with other steps and/or combined. The magnetic recording transducer being fabricated may be part of a merged head that also includes a read head (not shown) and resides on a slider (not shown) in a disk drive. The method 200 is described in the context of forming a single transducer 120 in a disk drive 100. However, the method 200 may be used to fabricate multiple transducers at substantially the same time. Further, the method 200 may be used in fabricating other transducer including but not limited to the transducers 120', 120" and/or 120'''. The method 200 and system are also described in the context of particular layers. However, in some embodiments, such layers may include multiple sub-layers. The method 200 also may commence after formation of other portions of the magnetic recording transducer.

A write pole 124 configured to write to a region of the media 102 is provided, via step 202. Step 202 typically include multiple substeps that form the pole 124. One or more write coils 126 are provided, via step 204.

A grating 150 that is to be optically coupled with the laser is provided, via step 206. Step 206 typically includes depositing and patterning the core and cladding layers for the grating 152, as well as providing the reflector(s) 154 and/or 156. A tapered interferometric waveguide 140 optically coupled with the grating 150 is provided, via step 208. Step 208 typically includes depositing cladding and core layers for the waveguide 140 and defining the waveguide (e.g. the waveguide core) 140 using photolithography. Steps 206 and 208 may be performed together. As part of steps 208 a mode converter may optionally be provided. The near field transducer 128 may also be provided, via step 210. Fabrication of the HAMR transducer 120 may then be completed, via step 212. For example, shields, other poles, a read transducer and/or other components may be formed.

Using the method 200, the transducer(s) 120, 120', 120" and/or 120''' may be fabricated. Consequently, the benefits of the HAMR transducer 120/120'/120"/120''' may be achieved.

Figure 9:
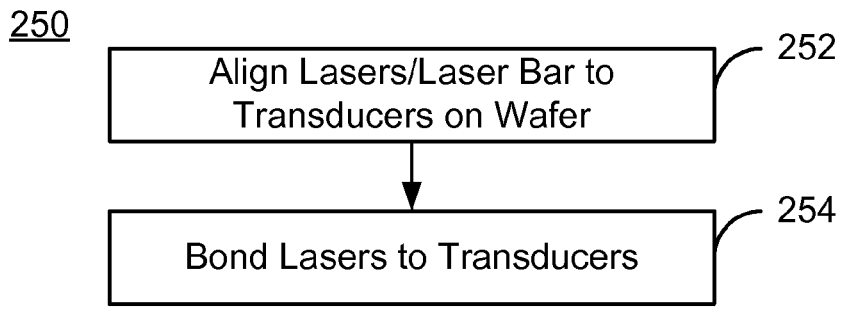
FIG. 9 is a flow chart depicting an exemplary embodiment of a method for bonding lasers to a HAMR transducer.

FIG. 9 is a flow chart depicting an exemplary embodiment of a method 250 for bonding lasers with HAMR transducers having coupling gratings used in conjunction with IWGs. In particular, the method 250 may be used in fabricating a HAMR disk drive 100. For simplicity, some steps may be omitted, performed in another order, interleaved with other steps and/or combined. The method 250 is described in the context of bonding laser(s) for disk drive(s) 100. The method 250 typically commences after the transducers 120 have been formed on the surface of the substrate that will be used for the sliders but before substrate has been cut to separate individual transducers 120. In some embodiments, the wafer may have been cut such that the method 250 is performed for only a portion of the transducers 120 that were fabricated on the wafer.

The laser(s) 130 are aligned with transducers 120 on a wafer, via step 252. In some embodiments, the lasers are in laser bar(s). A laser bar typically includes a row of lasers on the substrate on which the lasers are fabricated. However, in other embodiments, other arrangements including but not limited to single lasers and a two-dimensional array of lasers may be used. The transducers 120 have been fabricated on the wafer and typically are formed in a two dimensional array. Because of the use of the coupling gratings 150, the alignment step 252 has greater tolerances in at least one dimension. Once the alignment has been completed, the lasers may be wafer bonded to the transducers on the substrate, via step 254.

Thus, using the method 250, the lasers 130 may be bonded to the transducers 120 and, therefore, the sliders 110. Consequently, the benefits of the transducers 120, 120', 120" and/or 120''' and disk drive 100 may be achieved.

We claim:

1. A heat assisted magnetic recording (HAMR) transducer coupled with a laser for providing energy and having an air-bearing surface (ABS) configured to reside in proximity to a media during use, the HAMR transducer comprising:
    a write pole configured to write to a region of the media;
    at least one coil for energizing the write pole;
    a grating optically coupled with the laser; and
    an interferometric waveguide (IWG) optically coupled with the grating and having a plurality of arms, the plurality of arms having an optical path difference.

2. The HAMR transducer of claim 1 wherein the IWG is a tapered interferometric waveguide (ITWG) having a tapered region including an entrance distal from the ABS, a bottom proximate to the ABS, a first side and a second side opposite to the first side, at least a portion of the first side and at least a portion of the second side converging such that the first side is closer to the second side at the bottom than at the entrance.

3. The HAMR transducer of claim 2 wherein the at least the portion of the first side and the at least the portion of the second side converge in accordance with a function having at least one term having an order greater than one.

4. The HAMR transducer of claim 1 wherein the order is at least two such that the at least one term includes a quadratic term.

5. The HAMR transducer of claim 1 wherein the grating further includes a bottom reflector.

6. The HAMR transducer of claim 5 wherein the bottom reflector includes at least one of a Bragg reflector and a mirror.

7. The HAMR transducer of claim 1 further comprising:
a reflector, the grating residing between the reflector and the IWG.

8. The HAMR transducer of claim 7 wherein the reflector includes at least one of a Bragg reflector and a mirror.

9. The HAMR transducer of claim 7 wherein the reflector is substantially parallel to the ABS.

10. The HAMR transducer of claim 7 wherein the reflector is substantially perpendicular to the ABS.

11. The HAMR transducer of claim 1 further comprising:
a near-field transducer (NFT), a portion of the NFT residing at the ABS, a portion of the energy from the laser traveling through the plurality of arms of the IWG forming an interference pattern at the NFT such that the NFT couples part of the portion of the energy from the grating to the media.

12. A heat assisted magnetic recording (HAMR) transducer coupled with a laser for providing energy and having an air-bearing surface (ABS) configured to reside in proximity to a media during use, the HAMR transducer comprising:
a write pole configured to write to a region of the media;
at least one coil for energizing the write pole;
a coupling grating optically coupled with the laser, the coupling grating including an optical grating and a bottom reflector, the optical grating residing between the laser and the bottom reflector;
a tapered interferometric waveguide (ITWG) optically coupled with the grating, the ITWG including a tapered region and a plurality of arms, the tapered region including an entrance distal from the ABS, a bottom proximate to the ABS, a first side and a second side opposite to the first side, at least a portion of the first side and at least a portion of the second side converging in accordance with a function such that first side is closer to the second side at the bottom than at the entrance, the function including a quadratic term, the plurality of arms having an optical path difference;
a reflector, the coupling grating residing between the reflector and the ITWG; and
a near-field transducer (NFT), a portion of the NFT residing at the ABS, a portion of the energy from the laser traveling through the plurality of arms of the ITWG forming an interference pattern at the NFT such that the NFT couples part of the portion of the energy from the grating to the media.

13. A heat assisted magnetic recording (HAMR) disk drive comprising:
a media for storing data;
a slider having an air-bearing surface (ABS) configured to reside in proximity to the media during use;
a laser coupled with the slider for providing energy; and
a HAMR transducer coupled with the slider and including a write pole, at least one coil, a grating, and an interferometric waveguide (IWG), the write pole being configured to write to a region of the media, the at least one coil for energizing the write pole, the grating being optically coupled with the laser, the IWG being optically coupled with the grating and having a plurality of arms, a portion of the energy from the laser being coupled into the grating, into the IWG from the grating and directed toward the ABS along each of the plurality of arms, the plurality of arms having an optical path difference.

14. A method for providing a heat assisted magnetic recording (HAMR) transducer coupled with a laser for providing energy and having an air-bearing surface (ABS) configured to reside in proximity to a media during use, the method comprising:
providing a write pole configured to write to a region of the media;
providing at least one coil for energizing the write pole;
providing a grating optically coupled with the laser; and
providing an interferometric waveguide (IWG) optically coupled with the grating and having a plurality of arms, a portion of the energy from the laser being coupled into the grating, into the IWG from the grating and directed toward the ABS along each of the plurality of arms, the plurality of arms having an optical path difference.

15. The method of claim 14 wherein the IWG is a tapered interferometric waveguide (ITWG) having a tapered region including an entrance distal from the ABS, a bottom proximate to the ABS, a first side and a second side opposite to the first side, at least a portion of the first side and at least a portion of the second side converging such that the first side is closer to the second side at the bottom than at the entrance.

16. The method of claim 15 wherein the at least the portion of the first side and the at least the portion of the second side converge in accordance with a function having at least one quadratic term.

17. The method of claim 14 wherein the grating further includes a bottom reflector.

18. The method of claim 17 wherein the bottom reflector includes at least one of a Bragg reflector and a mirror.

19. The method of claim 14 further comprising:
providing a side reflector, the grating residing between the side reflector and the IWG.

20. The method of claim 19 wherein the side reflector includes at least one of a Bragg reflector and a mirror.

21. The method of claim 19 wherein the side reflector is substantially parallel to the ABS.

22. The method of claim 19 wherein the side reflector is substantially perpendicular to the ABS.

23. The method of claim 14 further comprising:
providing a near-field transducer (NFT), a portion of the NFT residing at the ABS, a portion of the energy from the laser traveling through the plurality of arms of the IWG forming an interference pattern at the NFT such that the NFT couples part of the portion of the energy from the grating to the media.

* * * * *